Dec. 1, 1942.  H. W. LINN  2,303,852
EXTENSIBLE PITCH CONTROL LINK FOR MECHANICAL SHOVELS
Filed Nov. 18, 1940  2 Sheets-Sheet 2
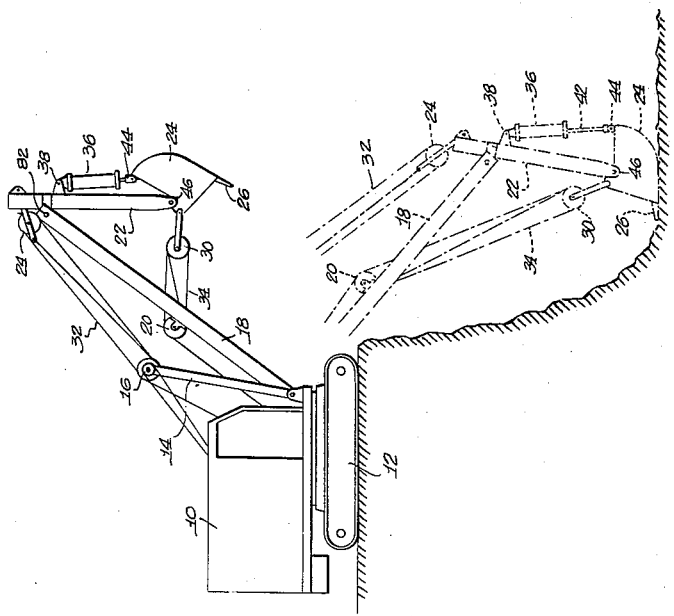
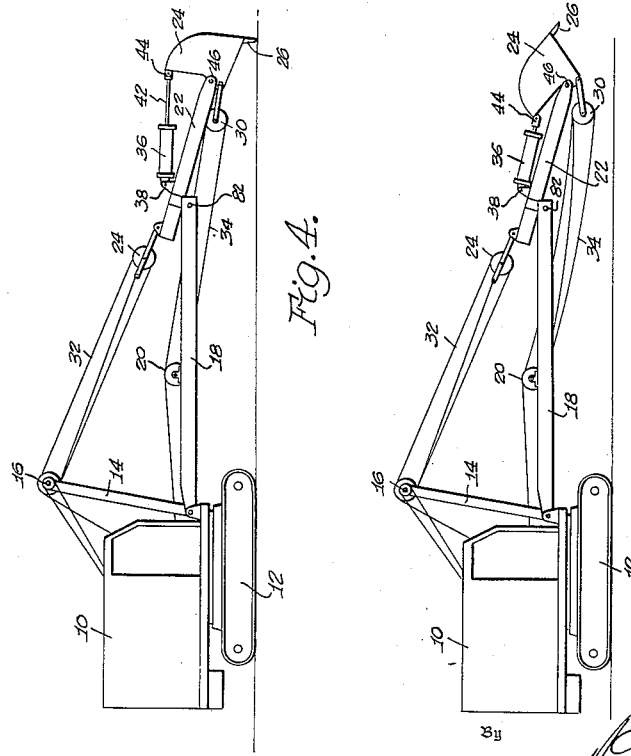
Inventor
Henry W. Linn
By
Attorneys Patented Dec. 1, 1942

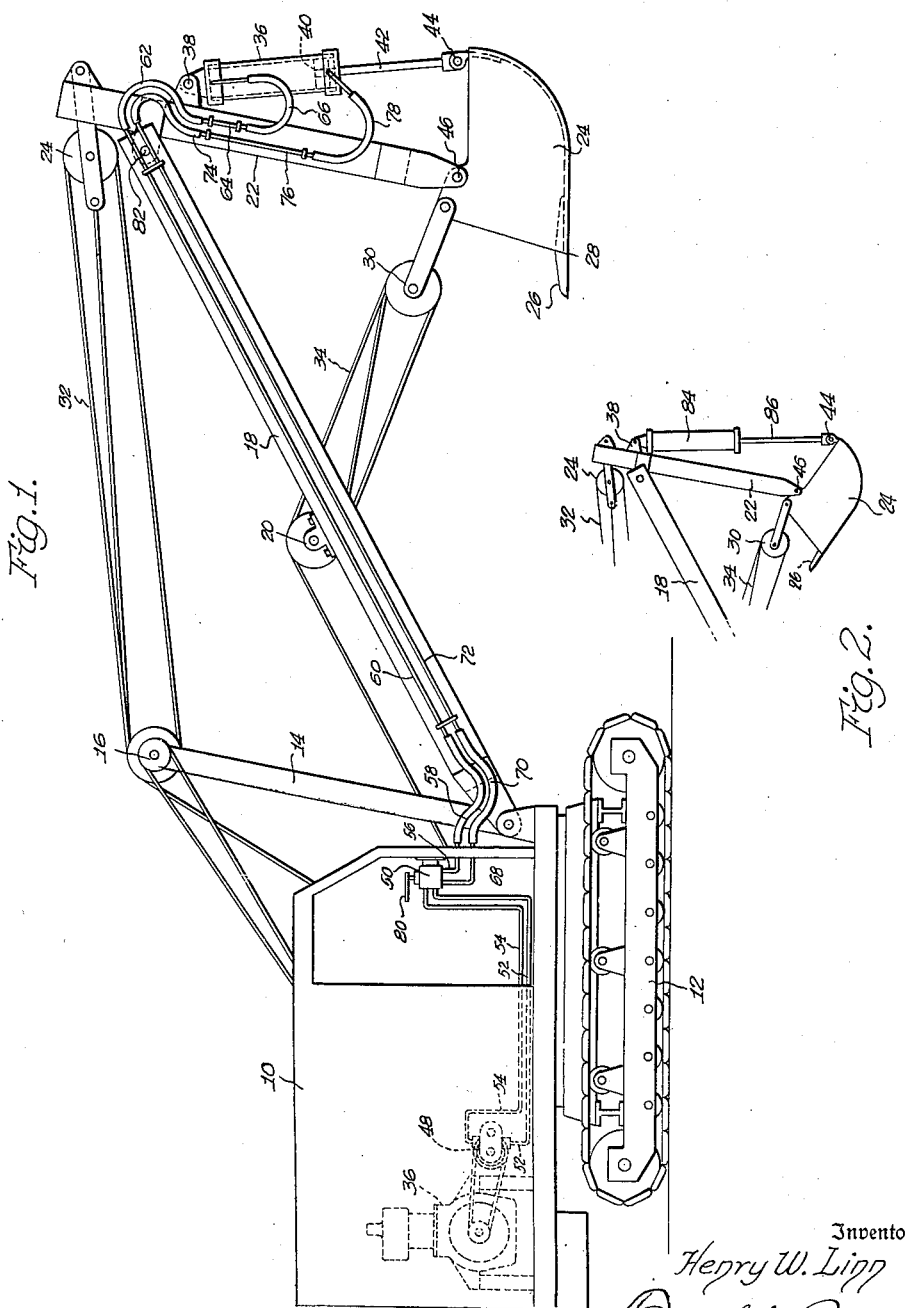

2,303,852

UNITED STATES PATENT OFFICE 2,303,852

EXTENSIBLE PITCH CONTROL LINK FOR MECHANICAL SHOVELS

Henry W. Linn, Highland Park, Mich.

Application November 18, 1940, Serial No. 366,035

8 Claims. (Cl. 214—138)

This invention relates to a new and useful improvement in mechanical shovels, and particularly to apparatus for moving the dipper relative to the dipper-arm.

One object of this invention is to provide apparatus under the control of the operator for dumping the dipper.

Another object of the invention is to provide apparatus under control of the operator for adjusting the position of the dipper relative to the dipper-arm.

A further object of the invention is to provide apparatus for controlling the cutting angle of the dipper.

Still another object of the invention is to provide means for extending and contracting the link between the dipper arm and the dipper.

A further object of the invention is to provide hydraulic fluid pressure for expanding and contracting said link.

Other and further objects and advantages of the invention will become apparent from the following description in which reference is made to the accompanying drawings, of which there are two sheets, in which:

Fig. 1 is a side elevation of a mechanical shovel with applicant's device attached;

Fig. 2 is a view of a dipper and surrounding members with a modification of applicant's device attached;

Fig. 3 is a view of a mechanical shovel showing in dot-and-dash lines the position at the end of a cutting stroke and in full lines the dumping of the dipper;

Fig. 4 is a view of a mechanical shovel with the dipper in extended position, as at the beginning of a cutting stroke; and Fig. 5 is a view of a mechanical shovel with the dipper in extended position and the link between the dipper-arm and the dipper in contracted position.

It will be observed that the invention has been shown as applied to a mechanical shovel of the type known as the "pull shovel." However, it is not desired to limit the invention to use in conjunction with such a shovel, in as much as, with certain modifications, it might be applied to other types of shovels.

An ordinary pull shovel comprises a cab 10, mounted on a truck 12 having caterpillar treads to permit movement of the truck. The cab 10 ordinarily may be power rotated with respect to the truck 12.

Extending from the cab 10 is a mast 14, on the outer end of which is a sheave 16. Likewise extending from the cab 10 is a boom 18. Mounted approximately midway on the boom 18 is the boom sheave 20. Pivotally mounted on the end of the boom 18 is a dipper arm 22. On the upper end of the dipper arm 22 is a pulley 24. On the lower end of the dipper arm 22 is a dipper or bucket 24 having teeth 26 spaced along its cutting edge 28. A pulley 30 is affixed to the dipper above the cutting edge 28.

Extending from the cab 10 over the sheave 16 to the pulley 24 is a hoist cable 32. Extending from the cab 10 over the boom sheave 20 to the pulley 30 is a drag cable 34. Within the cab 10 is a motor 36 driving drums (not shown) which wind and unwind the cables 32 and 34.

By proper manipulation of the controls for the drums winding and unwinding the cables 32 and 34 the operator of the shovel may cause the dipper 24 to cut and remove earth or other material. The cutting edge 28 is moved toward the cab 10, the teeth 26 assisting in its cutting movement. The beginning of such a stroke is illustrated in Fig. 4 and the end of such a stroke in the dot-and-dash view in Fig. 3. The exact manner of operation to achieve the desired cutting is not pertinent to the present invention.

In the ordinary shovel of this type there is a rigid, non-extensible pitch link extending from a position on the dipper arm to a position on the dipper, which fixes the relative position of the dipper and its arm or what may be termed the pitch of the dipper. Occasionally, it is provided that the link may be placed in certain positions of adjustment, so that to a limited extent adjustability of the cutting angle of the cutting edge 28 is obtained.

Applicant employs instead of such a fixed link a link which may be extended or contracted under control of the operator. A hydraulic cylinder 36 depends from the hanger 38 attached to the boom 22. Within the cylinder 36 is a piston 40, attached to one end of which is a piston rod 42, the remote end of which is held by a bracket 44 on the dipper 24. The connections between the cylinder 26 and the hanger 38 and the piston rod 42 and the bracket 44 are pivotal so that when the piston 40 is moved to the upper end of the cylinder 36 the dipper 24 rotates about the pivots 46 with respect to the dipper arm 22.

Movement of the piston 40 is illustrated as being caused by hydraulic pressure, although steam, compressed air, or other media might be employed. A suitable pump 48, such as a gear pump, is connected to the motor 36. A valve 50 is installed in the cab 10 where it may be operated conveniently. Pipes 52 and 54 connect the discharge and intake ports of the pump 48 with corresponding ports of the valve 50. One port of the valve 50 is connected with the upper end of the cylinder 36 by means of pipe 56, flexible hose 58, pipe 60, flexible hose 62, pipe 64 and flexible hose 66. Another port of the valve 50 is connected with the lower end of the cylinder 36 by means of pipe 68, flexible hose 70, pipe 72, flexible hose 74, pipe 76 and flexible hose 78. The pipes 60 and 72 and 64 and 76 may be concealed within the boom 18 and the dipper arm 22 respectively. Flexible hose is employed so that the boom 18, the dipper arm 22 and the dipper 24 may move freely without interference by a rigid connection, although other means to accomplish the same result might be employed.

The operator by manipulation of the handle 80 of the valve 50, may cause pressure from the pump 48 to act upon either side of the piston 40. In this manner the operator may cause movement of the dipper 24 at will and thus control the pitch of the dipper. It is also provided that the valve 50 be placed in neutral position so that no fluid will flow through the pipes and flexible hoses. The piston 40 is then locked in position.

With the old type of construction it is customary to dump the dipper 24 after it is full by causing the dipper arm 22 to be carried upward in approximately a vertical position until the dipper clears the hole being excavated. The dipper arm 22 is then moved to an approximately horizontal position by movement about the pivot 32. The contents of the shovel then fall by gravity from the dipper 24.

Such a method of dumping has a number of disadvantages, among which are that there may not be enough room to move the dipper arm 22 to horizontal position if the position of walls and other obstructions interferes with such movement, that there is a waste of time in moving the dipper arm to horizontal position, and likewise a waste of power. Furthermore, if the earth carried by the dipper is damp it may cohere in one or more large lumps. The lumps tend to remain within the shovel until the dipper arm has reached a horizontal position and then let go suddenly. If the shovel is discharging into a truck, the sudden impact of the lumps of earth falling from a considerable height tends to damage the truck.

In shovels equipped with applicant's invention, after the dipper 24 is full, the operator causes the dipper arm 22 to be raised vertically until the dipper 24 is immediately above the desired point of discharge. Hydraulic pressure is then applied from the pump 48 through the valve 50 to force the piston 40 upward in the cylinder 36. This results in a rotation of the dipper 24 with respect to the dipper arm 22 about the pivots 46. The dipper then gradually assumes the position shown in the full lines of Fig. 3. The contents of the dipper flow from the dipper by gravity during the gradual movement of the piston 40.

It will be seen that such a manner of dumping the dipper requires considerably less room than the prior shovels, that less time is required to dump the dipper, and that less power is required in that the heavy dipper arm 22 is not moved. Furthermore, since the dipper is not at a great height above the truck into which the contents are to be dumped, if the contents let go suddenly, there is not any considerable damage to the truck.

The utility of the hydraulic cylinder 36 is not restricted merely to dumping the dipper 24. It may also be employed to move the dipper into various positions of adjustment during the cutting stroke of the shovel. Thus the position or pitch of the cutting edge 28 and the teeth 26 relative to the dipper arm 22 may be regulated. This feature is illustrated in Figs. 4 and 5, showing the commencement of cutting strokes. The dipper might be held at any intermediate position of adjustment between the two extremes shown in Figs. 4 and 5. Such adjustability is important when it is desired to make a straight vertical cut in an excavation, for example. The particular positions of adjustment will depend upon the particular jobs on which the shovel is used.

A modification of the invention is shown in Fig. 2. It will be seen that the cylinder 84 is longer than the cylinder 36 shown in Fig. 1 and the piston rod 86 is longer than the piston rod 42. The hanger 38 is attached to the dipper arm 22 at a higher point than in Fig. 1. Hence, the piston within the cylinder 84 has a longer stroke. This permits the dipper 24 to swing into the position shown in Fig. 2, i. e., pitched upwardly. This position of adjustment is particularly advantageous in cutting the near side of an excavation.

Other modifications of the invention will be apparent to those skilled in the art. Although a specific shovel employing applicant's invention has been illustrated and described, it is not desired to limit the invention to this particular structure.

It should be understood that the cylinder 36 might be attached to the dipper 24 and the piston rod 42 attached to the hanger 38, thereby reversing the relative positions of these two elements from that shown and described above. This arrangement has the advantage of the fact that the operator can then estimate the position of the dipper 24 with respect to the dipper arm 22 by observing the position of the upper end of the cylinder along the piston rod. The higher the cylinder, the more the dipper is tilted. By experience the operator can then estimate the position of the dipper although the dipper itself may be concealed within the excavation.

What I claim is:

1. In a mechanical shovel, a vertically swinging boom, a dipper arm pivoted to said boom, a dipper, a pivotal connection between said dipper and said dipper arm, a cylinder, a double acting piston within said cylinder, a pivotal connection for directly attaching said cylinder to said dipper arm adjacent said pivotal connection, a pivotal connection directly connecting the dipper to the double acting piston, and means for applying fluid pressure to opposite sides of said cylinder.

2. In a shovel having a dipper, a dipper arm and a pivotal connection therebetween, a pitch link between said dipper and said dipper arm, including a fluid pressure cylinder rockingly mounted on the dipper arm, a piston having a piston rod directly connecting the dipper for extending and contracting said link to dump said dipper, and means for applying fluid pressure to both ends of said fluid pressure cylinder.

3. In a shovel having a dipper, a dipper arm and a pivotal connection therebetween, a pitch link comprising a cylinder, a piston therewithin, and a piston rod, one end of said pitch link being pivotally attached directly to said dipper and the other end of said pitch link being pivotally attached to said dipper arm, and fluid pressure means to move said piston to opposite ends of said cylinder to effect extension and contraction of said pitch link and the rocking of said dipper on its pivot.

4. In a mechanical shovel, a dipper, a dipper arm, a pivotal connection between the front of said dipper and said dipper arm, and fluid pressure means having one end pivotally attached to said dipper arm and the other end directly pivoted to said dipper at a point removed from said pivotal connection to cause movement of said dipper about said pivotal connection, said fluid pressure means being so positioned as to exert a maximum pull on the dipper when in its loaded position.

5. In a mechanical shovel having a vertically swinging boom, a dipper adapted to be supported by the boom, a dipper arm interposed between the boom and dipper, a pivotal connection between said dipper and said dipper arm adjacent the open end of said dipper, and double acting fluid pressure means under control of the operator having one end rockingly attached to said dipper arm and the other end pivotally attached directly to said dipper at a point removed from said pivotal connection to cause movement of said dipper about said pivotal connection in both directions.

6. In a shovel having a dipper and a dipper arm pivoted thereto, means for causing relative swinging movement of said dipper relative to said dipper arm comprising, a cylinder swingingly mounted on the dipper arm, a piston within said cylinder directly connected to the closed end of said dipper, a pump, and valve means under control of the operator to apply fluid pressure to either side of said piston whereby said dipper will be rocked in both directions about said pivot.

7. A shovel, a vertically swinging boom on the shovel, a dipper arm pivoted to the boom, a dipper pivoted to the lower end of the dipper arm to swing to and fro of said shovel, means for causing relative swinging movement of said dipper relative to said dipper arm comprising, a cylinder pivoted to the dipper arm, a piston within said cylinder directly connected to the dipper, a pump, and valve means under control of the operator to apply fluid pressure to either side of said piston from said pump and to hold said piston in fixed position.

8. In a pull shovel having a dipper, a dipper arm upon which said dipper is pivotally mounted about an axis above the cutting edge of said dipper, and means for causing said dipper to be drawn toward the cab of said pull shovel to excavate, a device for varying the pitch angle of said dipper with respect to said dipper arm comprising, a double-acting hydraulic cylinder, a piston within said cylinder and having a piston rod extending therefrom, said cylinder, piston and rod constituting a pitch control unit, one end of said pitch control unit being pivotally mounted on the upper portion of said dipper arm, the other end of said pitch control unit being pivotally mounted on the upper edge of said dipper remote from the cutting edge, a pump, a valve, conduits between said pump and said valve, conduits including flexible connections between said valve and each end of said cylinder, whereby upon application of hydraulic pressure to opposite sides of said cylinder the length of said pitch control unit may be increased and decreased to affect the cutting edge of said dipper during an excavating stroke and to dump the dipper after completion of an excavating stroke.

HENRY W. LINN.